United States Patent
Sano et al.

[11] Patent Number: 5,309,539
[45] Date of Patent: May 3, 1994

[54] COMMUNICATION CABLE

[75] Inventors: Hiroaki Sano; Jun-ichi Ohta; Nobuyuki Suzuki, all of Kanagawa, Japan

[73] Assignee: Sumitomo Electric Industries, Ltd., Osaka, Japan

[21] Appl. No.: 767,779

[22] Filed: Sep. 30, 1991

[30] Foreign Application Priority Data

Oct. 2, 1990 [JP] Japan ................................. 2-265852

[51] Int. Cl.$^5$ ............................................... G02B 6/44
[52] U.S. Cl. ............................................... 385/106
[58] Field of Search .......................................... 385/106

[56] References Cited

U.S. PATENT DOCUMENTS

| | | | |
|---|---|---|---|
| 4,575,184 | 3/1986 | Ueno et al. | 385/101 |
| 4,787,707 | 11/1988 | Kitayama et al. | 385/128 X |
| 4,840,453 | 6/1989 | Kitayama | 385/104 |
| 4,952,021 | 8/1990 | Aoki et al. | 385/109 |
| 4,953,945 | 9/1990 | Nishimura et al. | 385/114 |
| 4,957,345 | 9/1990 | Sakuma et al. | 385/109 |

*Primary Examiner*—Akm E. Ullah
*Attorney, Agent, or Firm*—Sughrue, Mion, Zinn, Macpeak & Seas

[57] ABSTRACT

A communication cable comprising an outer sheath layer and at least one pipe through which an optical fiber unit is laid by means of a compressed gas, the outer sheath layer comprising a high-melting and flame-retardant resin and having on the inside thereof an inorganic fiber layer. The communication cable has excellent flame retardance.

5 Claims, 2 Drawing Sheets

COMMUNICATION CABLE

FIELD OF THE INVENTION

The present invention relates to a communication cable comprising at least one pipe through which an optical fiber unit is laid by means of a compressed gas (hereinafter referred to as a "pipe cable").

BACKGROUND OF THE INVENTION

As a method for laying an optical fiber cable, a pressurized gas carriage system has been proposed in which an optical fiber unit composed of a single optical fiber or plural optical fibers is carried in a pipe made of synthetic resins, etc. by use of compressed air, etc. as disclosed in JP-A-59-104607 (the term "JP-A" as used herein means an "unexamined published Japanese patent application"). According to this cable laying system, parts of a pipe cable other than an optical fiber unit are produced in a factory and laid on buildings, etc., and an optical fiber unit is then laid to complete a communication cable in the final stage of construction.

In this system, optical fibers receive no outer force, such as tension, the optical fibers are not damages upon laying. Further, since the optical fiber unit is carried through a previously laid pipe by utilizing a compressed fluid, it can thread its way even on a complicated route. Furthermore, since optical fiber units can be exchanged or added after construction, maintenance of communication equipment is easy and the cost of cable laying is reduced.

On the other hand, with the recent rise of height of buildings, demands for communication cables to have flame spread resistance or surviving properties on fire have increased as pointed in *Proceedings of The 1989th International Wire and Cable Symposium*, pp. 301-305.

Hence, the inventors of the present invention previously proposed a flame-retardant pipe cable as described in JP-A-2-114219. The structure of the proposed pipe cable is shown in FIGS. 2(a) and 2(b), in which six pipes 11 each containing an optical fiber unit and high tensile body 12 are jacketed by outer sheath layer 10 comprising flame-retardant polyethylene, and thereby the pipe cable has improved flame retardance. Each pipe has a double-layered structure composed of flame-retardant polyethylene outer layer 13 and crosslinked polyethylene inner layer 14 as illustrated in FIG. 2(b).

However, even with such a structure, melting of the resins is hardly avoidable when heat above a certain level is applied for a long time, and outer sheath layer 10 and flame-retardant polyethylene layer 13 melt and run to cause the optical fiber units laid in the pipes to be exposed to heat and air and broken by combustion. Therefore, the conventional pipe cables are still insufficient in survivability on fire as communication cables.

SUMMARY OF THE INVENTION

An object of the present invention is to provide a pipe cable having excellent flame retardance.

Other objects and effects of the present invention will be apparent from the following description.

The present invention provides a pipe cable comprising an outer sheath layer and at least one pipe through which an optical fiber unit is laid by means of a compressed gas, the outer sheath layer comprising a high-melting and flame-retardant resin (a flame reratdant resin having a high melting point) and having on the inside thereof an inorganic fiber layer.

It is preferred that the pipe(s) is/are individually coated with an inorganic fiber layer.

DETAILED DESCRIPTION OF THE INVENTION

The structure of the pipe cable according to the present invention will be explained by referring to the accompanying drawings.

Figure 1A:
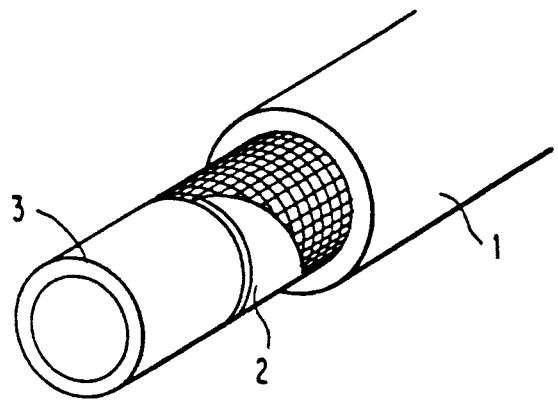
FIGS. 1(a) & (b) illustrates the structure of the pipe cable according to the present invention.
Figure 1B:
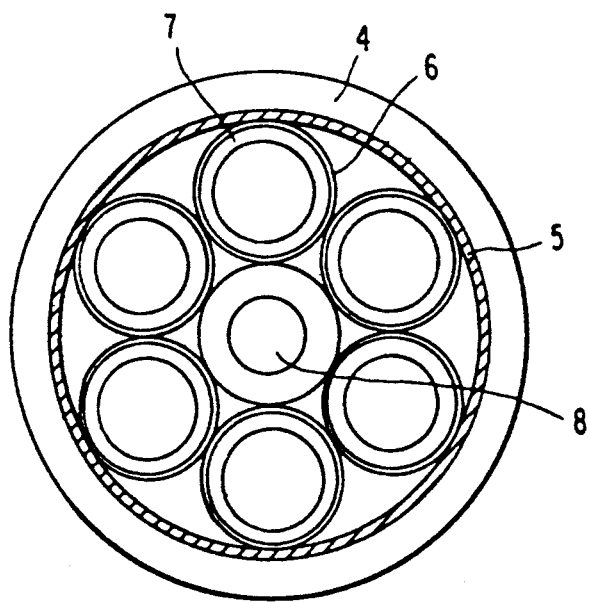

FIGS. 1(a) and 1(b) each illustrate an example of the pipe cable according to the present invention. FIG. 1(a) shows a single pipe cable having one pipe, in which pipe 3 comprising a synthetic resin, e.g., a fluorine resin and polyethylene, has on the outer surface thereof inorganic fiber layer 2 formed by winding glass fiber cloth, etc., and is further coated with outer sheath layer 1 comprising high-melting and highly flame-retardant fluorine resin.

FIG. 1(b) illustrates a multi-pipe cable having six pipes, in which outer sheath layer 4 comprises a high-melting and highly flame-retardant fluorine resin and has on the inside surface thereof inorganic fiber layer 5 formed by winding glass fiber cloth, etc. Each pipe 7 comprises a synthetic resin, e.g., a fluorine resin and polyethylene, and has on the outer surface thereof inorganic fiber layer 6 formed by winding glass fiber cloth, etc. High tensile body 8, which is positioned at the center of the pipe cable, comprises an FRP rod coated with a fluorine resin layer.

In the present invention, the outer sheath layer comprises a high-melting and flame-retardant resin so as to have an increased melting temperature. Examples of the high-melting and flame-retardant resins which can be used in the present invention include fluorine resins having a higher melting point than conventionally employed flame-retardant polyethylene and, in addition, reactive synthetic resins having no melting point, e.g., ladder type silicone resins, polyimide resins, and polyamide resins. Examples of the fluorine resin include polyvinylidene fluoride, polyhexafluoropropylene, and ethylene-tetrafluoroethylene copolymers. These polymers are commercially available, for example, under the trademarks of "KYNAR FLEX 2800", KYNAR FLEX 2900" (produced by Pennwalt, U.S.A.) and "SOLEF 1012" (produced by Solvay, Belgium) for polyvinylidene fluoride; "Teflon FEP100" (produced by Du Pont, U.S.A.) for hexafluoropropylene; and "Tefzel 210" (produced by Du Pont, U.S.A) for ethylenetetrafluoroethylene copolymers. The above polymers may contain flame-retardant fillers such as glass fillers, carbon filler and the like.

The thickness of the outer sheath is preferably from 0.3 to 5 mm. Although higher flame-retardant effect can be obtained by using a thicker outer sheath, the flame-ratardant effect is generally saturated at a outer sheath thickness of about 4 to 5 mm.

The materials for the pipe are not particularly limited and may be conventional materials such as polyethylene. It is preferred however that the pipe comprises the materials described above for the outer sheath.

The dimensions of the pipe are not particularly limited and may have conventional configuration. It is preferred, for example, that the outer diameter of the pipe is from 4 to 6 mm when the inner diameter is 3 mm; the outer diameter is from 5 to 8 mm when the inner diameter is 4 mm; the outer diameter is from 8 to 10 mm when the inner diameter is 6 mm; the outer diameter is from 10 to 12 mm when the inner diameter is 8 mm; and the outer diameter is from 14 to 16 mm when the inner diameter is 10 mm.

A rise in temperature of the pipe(s) jacketed by the outer sheath is suppressed by providing inorganic fiber layer 2 having low heat conductivity between the pipe and the outer sheath layer in the case of a single pipe cable or by providing inorganic fiber layer 5 on the inside of the outer sheath layer and inorganic fiber layer 6 on the outside of each pipe in the case of a multi-pipe cable. Examples of materials which can be used as the inorganic fiber layer include ceramic fibers (e.g., glass fibers), asbestos, alumina fibers, and carbon fibers. The fiber diameter is preferably from 5 to 30 μm. These inorganic fibers may be used in the form of simple woven cloth or woven cloth molded with resins such as polyimide, polyamideimide, polysulfone and the above materials for the outer sheath. The woven cloth is preferably used in the form of a tape having a thickness of from 50 to 200 μm. The inorganic fiber layer is preferably formed by winding the tape while the half width of the tape is lapped over each other, resulting in a layer thickness of from 100 to 400 μm.

Since the inorganic fiber layer made of, for example, glass fiber is not heat-fused at temperatures below 1,000° C., outer sheath layer 1 or 4 comprising, for example, a fluorine resin having on the inside thereof inorganic fiber layer 2 or 5 (inclusive of inorganic fiber layer 6 on the outside of each pipe in the case of the multi-pipe cable) does not readily run even in its semi-molten state. Such a heat insulating structure is held for an extended period of time under heat. As a result, the optical fiber unit in the pipe is protected from direct exposure to flame or high-temperature air even when heat is applied for a long time so that the pipe cable may perform its function of communication and serve as a communication network on fire for a sufficient time.

The pipe cable having the flame-retardant structure according to the present invention is applicable not only to pipe cables containing an optical fiber unit(s) alone but also to those containing other flame-retardant plastic-insulated communication copper wires or flame-retardant power cables in combination.

The present invention is now illustrated in greater detail with reference to Examples, but it should be understood that the present invention is not deemed to be limited thereto.

EXAMPLE 1

Glass fiber cloth of 200 μm thick in a tape form having a width of 5 mm (fiber diameter: 20 μm) was wound around a polyvinylidene fluoride pipe ("KYNAR FLEX 2800") having an inner diameter (ID) of 6 mm and an outer diameter (OD) of 7.6 mm. The glass fiber layer thus formed was then coated with polyvinylidene fluoride ("KYNAR FLEX 2800") to obtain a pipe having a OD of 10 mm for a single pipe cable.

EXAMPLE 2

Glass fiber cloth of 200 μm thick was wound around a middle-density polyethylene (density: 0.935) pipe having an ID of 6 mm and an OD of 7.6 mm, and polyvinylidene fluoride was then coated thereon to obtain a pipe having an OD of 10 mm for a single pipe cable.

COMPARATIVE EXAMPLE 1

A polyvinylidene fluoride pipe having an ID of 6 mm and an OD of 10 mm was prepared as a conventional flame-retardant pipe for a single pipe cable.

COMPARATIVE EXAMPLE 2

A middle density polyethylene (density: 0.935) pipe having an ID of 6 mm and an OD of 7.6 mm was prepared, and glass fiber cloth of 200 μm thick was wound around the pipe, and flame-retardant polyethylene was then coated thereon to obtain a conventional flame-retardant pipe cable having an OD of 10 mm for a single pipe cable.

COMPARATIVE EXAMPLE 3

A middle-density polyethylene (density: 0.935) pipe having an ID of 6 mm and an OD of 7.6 mm was prepared, and the pipe was then coated with flame-retardant polyethylene to obtain a conventional flame-retardant pipe cable having an OD of 10 mm for a single pipe cable.

Figure 3:
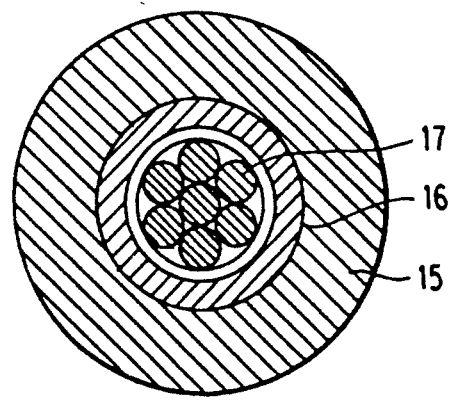
FIG. 3 illustrates the structure of an optical fiber unit.

An optical fiber unit having a structure shown in FIG. 3 was laid through each of the pipes obtained in Examples 1 and 2 and Comparative Examples 1 to 3 to obtain a single pipe cable. The optical fiber unit used herein had an OD of 2 mm and composed of a fiber bundle of seven optical fibers 17 each having an OD of 250 μm, the fiber bundle being coated with polypropylene layer 16 and further coated with expanded polyethylene layer 15. The thus obtained pipe cable was subjected to flame retardance test as follows.

Flame Retardance Test Method

A tunnel of 50 cm wide, 1 m high and 8 m long was built with fire bricks. Glass rods were laid across the tunnel at 20 cm intervals on the level of about 50 cm high, and the above obtained pipe cables having a length of 7.5 m were laid on the glass rods to have a total width of 30 cm. A methane gas burner of 88 kW was placed right under one end of the cables, and air was passed through the tunnel toward the other end at a speed of 75 cm/min. The change of the pipe cables was observed for 20 minutes at the longest.

The time required for all the resin layers of the outer sheath layer, pipe, and optical fiber unit to be lost to length of 2 m due to combustion or melting and the state of the pipe cable at that point are shown in Table 1. The state of the pipe cable in Examples 1 and 2 shown in Table 1 were the state after 20 minutes from the start of the test.

TABLE 1

| Example No. | Time Required for 2 m Resin Layer Loss | State of the Cable at 2 m Resin Layer Loss |
| --- | --- | --- |
| Example 1 | 20 min. or more | Outer sheath carbonized and fusion-deformed. Shape of inside pipe retained. Optical fiber unit was normal. |
| Example 2 | 20 min. or more | Outer sheath carbonized and fusion-deformed. Inside pipe deformed to the extent more than Example 1. Optical fiber unit was normal. |
| Comparative Example 1 | 9 min. | All the resin layers of outer sheath, pipe and optical fiber |

TABLE 1-continued

| Example No. | Time Required for 2 m Resin Layer Loss | State of the Cable at 2 m Resin Layer Loss |
|---|---|---|
| | | unit fallen off. Optical fiber was cut. |
| Comparative Example 2 | 7 min. | Same as Comparative Example 1 |
| Comparative Example 3 | 3 min. | Same as Comparative Example 1 |

It was thus found that excellent flame retardant properties are obtained by a combination of a fluorine resin layer and an inorganic fiber layer as proved by the results of Examples 1 and 2. In Example 2, in which a polyethylene pipe of high practical value is used, the effects of the inorganic fiber layer and fluorine resin layer on the outside of the pipe also proved to produce great effects close to those obtained in Example 1.

EXAMPLE 3

A multi-pipe cable having the structure shown in Table 2 below according to the illustration of FIG. 1-(b) was prepared.

COMPARATIVE EXAMPLE 4

Figure 2A:
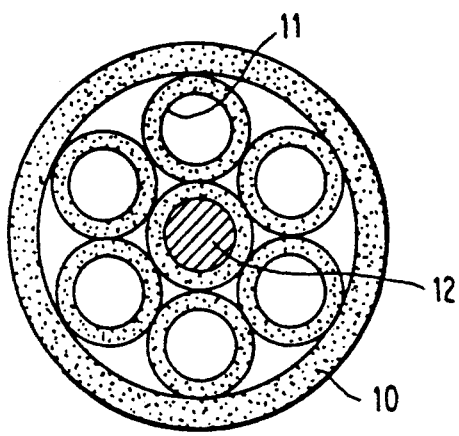
FIGS. 2(a) & (b) the structure of a conventional pipe cable.
Figure 2B:
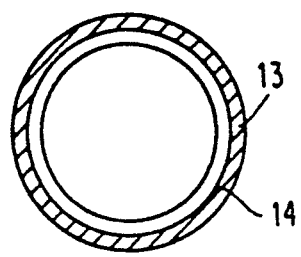

A conventional multi-pipe cable having the structure shown in Table 2 below according to the illustration of FIG. 2-(a) was prepared.

The multi-pipe cables of Example 3 and Comparative Example 4 each was tested in the same manner as described above. The results obtained are shown in Table 2.

TABLE 2

| | Example 3 | Comparative Example 4 |
|---|---|---|
| Structure: | | |
| Pipe | | |
| Material | polyvinylidene fluoride | middle density polyethylene |
| ID (mm) | 6.0 | 6.0 |
| OD (mm) | 7.6 | 6.8 |
| Pipe Outer Layer | | |
| Material | glass fiber cloth | flame-retardant polyethylene |
| OD (mm) | 8.0 | 8.0 |
| Inorganic Fiber Layer Inside Outer Sheath Layer | glass fiber cloth (200 μm thick) | none |
| Outer Sheath Layer | | |
| Material | polyvinylidene fluoride | flame-retardant polyethylene |
| OD (mm) | 29 | 29 |
| Test Results: | | |
| Time required for 2 m loss of all the resin layers of pipe cable | 20 min. or more | 5.5 min. |

In Comparative Example 4, melting of polyethylene of the outer sheath started from the heated part and rapidly spread. In 2 minutes from the start of the test, the outer sheath layer was fusion-deformed to the length of 4 m from the heated part. At this point of time, the inside flame-retardant polyethylene layer was also melted down to the length of about 1 m from the part in contact with the flame, and the optical fiber units were exposed and burnt. After 5.5 minutes from the start of the test, all the resin layers of the outer sheath layer, pipe, and optical fiber units were lost, and the glass fibers were exposed and cut off in parts.

In Example 3, after 20 minutes from the start of the test, the fluorine resin on the outer sheath surface was melted over the length of about 1 m from the part in contact with the flame, and the inner glass fiber cloth was exposed, but the inside pipes retained their shape. The optical fiber units were not directly exposed to hot air, and no cut of the fibers took place.

That is, the fluorine resin of the outer sheath layer was melted and united with the inside glass fiber cloth and thereby served as a protective layer for shape retention and protection from flame.

As described above, the present invention provides pipe cables having excellent flame retardance in which a high-melting and flame-retardant resin, such as a fluorine resin, is used as an outer sheath layer and an inorganic fiber layer is provided on the inside of the outer sheath resin layer and also on the outer surface of each pipe. The present invention thus makes it possible to satisfy requirements of important communication networks of multi-storied buildings, power stations, nuclear facilities, etc. which are demanded to serve their functions even on fire.

While the invention has been described in detail and with reference to specific examples thereof, it will be apparent to one skilled in the art that various changes and modifications can be made therein without departing from the spirit and scope thereof.

What is claimed is:

1. A communication cable comprising an outer sheath layer and at least one pipe through which an optical fiber unit is laid by means of a compressed gas, said outer sheath layer comprising a high-melting and flame-retardant resin and each of said at least one pipe is surrounded by an inorganic fiber layer on the surface thereof.

2. A communication cable as claimed in claim 1, wherein said high-melting and flame-retardant resin is a fluorine resin.

3. A communication cable as claimed in claim 1, wherein said inorganic fiber layer comprises ceramic fiber.

4. A communication cable as claimed in claim 1, wherein said pipe is individually coated with an inorganic fiber layer.

5. A communication cable as claimed in claim 1, wherein said pipe comprises a high-melting and flame-retardant resin.

* * * * *